Patented Sept. 19, 1950

2,522,940

UNITED STATES PATENT OFFICE 2,522,940

PROCESS FOR THE PRODUCTION OF PHENOLPHTHALEIN

Harry R. Gamrath, St. Louis, Mo., assignor to Monsanto Chemical Company, St. Louis, Mo., a corporation of Delaware No Drawing. Application April 25, 1949, Serial No. 89,560

8 Claims. (Cl. 260—337)

This invention relates to phenolphthalein; more specifically, this invention relates to an improvement in the process for the production of phenolphthalein.

Phenolphthalein is generally prepared commercially by the condensation reaction of 1 mol of phthalic anhydride with approximately 2 mols of phenol in the presence of a suitable condensation agent. The most widely used condensation agents are zinc chloride and sulfuric acid. Both of these agents, however, are not entirely satisfactory. When zinc chloride is used alone, the reaction proceeds quite slowly and long heating periods at relatively high temperatures are required to obtain good yields, or large quantities of zinc chloride are necessary which greatly affects the economics of the process. With the use of sulfuric acid as the condensation agent, undesirable concurrent reactions take place consuming costly quantities of phenol in the sulfonating action which always occurs.

Numerous agents have been proposed to be used in conjunction with zinc chloride in order to increase its condensation activity. Generally speaking, these activating agents have been of academic interest only as they have not proven to be too particularly desirable from a commercial stand point. Among these suggested activating agents are the aromatic sulfonic acids, hydrogen chloride and aluminum chloride.

Aromatic sulfonic acids are deficient as activating agents in that relatively large quantities of the acids are required to enhance the activity of the zinc chloride thereby rendering the process uneconomical. Large quantities of hydrogen chloride cause the formation of hydroxyanthraquinones. Aluminum chloride renders purification of the resultant phenolphthalein quite difficult due to the formation of aluminum complexes which necessitate treating the crude phenolphthalein with hot dilute mineral acids to remove the aluminum salts.

It is an object of this invention to provide an improvement in the process for the production of phenolphthalein. It is another object of this invention to provide an improvement in the process for the production of phenolphthalein wherein phenolphthalein may now be obtained in high yields and exceptional purity by the condensation reaction of 1 mol of phthalic anhydride with approximately 2 mols of phenol in the presence of zinc chloride as the condensation agent. Further objects will become apparent from the description of the novel process of this invention and the claims.

It has now been discovered that in the condensation reaction between phthalic anhydride and phenol in the presence of zinc chloride as the condensation agent, phenolphthalein may be obtained in exceptionally high yields and purity if there is also incorporated into the reaction mass a minor amount of an aryl sulfone chloride to serve as an activating agent for the zinc chloride condensation agent. Thus, a reaction mass consisting of phthalic anhydride, phenol, zinc chloride and a small quantity of an aryl sulfone chloride, when heated with agitation to the preferred temperature range, proceeds smoothly and readily to phenolphthalein in high yields. Typical of the aryl sulfone chlorides which exhibit this property of enhancing the activity of zinc chloride in the condensation of phthalic anhydride and phenol to form phenolphthalein are benzene sulfone chloride, toluene sulfone chlorides, mixtures of ortho- and para-toluene sulfone chlorides, xylene sulfone chlorides and alpha and beta naphthalene sulfone chlorides.

The outstanding and unpredictable utility of the novel improved process of this invention may be succinctly illustrated by comparing the yield of phenolphthalein obtained from a reaction which did not utilize an aryl sulfone chloride as an activating agent, with a similar reaction wherein an aryl sulfone chloride was utilized as an activating agent for zinc chloride. Thus, a charge made up of 1 mol of phthalic anhydride, 2 mols of phenol and ½ mol of zinc chloride when heated at 118° to 122° C. for 18 hours with continuous agitation produced a 43% yield of crude phenolphthalein. With no zinc chloride present a charge consisting of 1 mol of phthalic anhydride, 2 mols of phenol and 0.8 mol of a mixture of ortho- and para-toluene sulfone chlorides heated at 118° to 122° C. for 24 hours produced no phenolphthalein. Likewise, a charge consisting of 1 mol of phthalic anhydride, 2 mols of phenol and 0.4 mol of p-toluene sulfone chloride heated at 100° to 104° C. for 48 hours with continuous stirring, similarly produced no phenolphthalein. However, a charge containing 1 mol of phthalic anhydride, 2 mols of phenol, 0.5 mol of anhydrous zinc chloride and 0.25 mol of a mixture of ortho- and para-toluene sulfone chlorides heated at 118° to 122° C. for 18 hours produced a 97% yield of phenolphthalein.

The aforementioned characteristic accelerating effect of the aryl sulfone chlorides on the condensation reaction results when only relatively small quantities of the aryl sulfone chlorides are utilized. It is, therefore, preferred that from about 0.05 mol to about 0.25 mol of the aryl sulfone chloride be used for each mol of phthalic anhydride. When less than 0.05 mol per mol of phthalic anhydride is utilized, the condensation reaction rate decreases very rapidly. Charges of the aryl sulfone chloride in excess of 0.25 mol per mol of phthalic anhydride are not only uneconomical but also conducive to various side reactions resulting in the production of an impure product.

The preferred temperature range to be maintained during the condensation reaction is from about 85° C. to about 125° C. At the lower condensation temperatures, phenolphthalein is produced with the highest degree of purity; but with condensation temperatures below about 85° C., the reaction rate drops to such an extent that it is no longer commercially feasible. Temperatures in excess of 125° C. cause the formation of a considerable amount of impurities which renders the refining of phenolphthalein exceedingly difficult.

When an aryl sulfone chloride is used in the condensation reaction, the reaction mass remains sufficiently fluid to be stirred throughout the entire reaction period. The aryl sulfone chlorides or their decomposition products, appear to lubricate or soften the condensation mass thereby allowing an intimate mixing of the reactants, making it possible to operate at lower temperatures and for reaction periods of sufficient length to obtain satisfactory yields. In the absence of aryl sulfone chlorides, higher operating temperatures are required in order to maintain a fluid reaction mass. These higher temperatures, however, cause the formation of various impurities such as fluoran. If reaction temperatures below 100° C. are used without the use of aryl sulfone chlorides, the reaction mass sets to a non-stirrable solid long before a satisfactory yield of phenolphthalein is obtained. Such a mass is not workable on a commercial scale.

The quantities of phthalic anhydride, phenol and zinc chloride utilized in the improved process of this invention are governed by the same principle which governs their quantities in the processes heretofore practical wherein no aryl sulfone chloride was utilized as an activating agent for zinc chloride. Thus it is preferred for best yields that approximately two molecular proportions of phenol be utilized for each one molecular proportion of phthalic anhydride and approximately 0.5 molecular proportion of zinc chloride be utilized for each molecular proportion of phthalic anhydride. However, the quantities of these reactants are not of a critical nature from the standpoint of their behavior in the presence of the aryl sulfone chloride activating agents of this invention. The quantities of phthalic anhydride, phenol and zinc chloride may be varied to meet certain operating conditions and such a process will be substantially improved through the incorporation of an aryl sulfone chloride into the reaction mass.

The process for the production of phenolphthalein according to this invention is relatively simple. All chemicals may be charged together into a suitable reactor. The mixture is then heated in the desired temperature range until a satisfactory degree of reaction is obtained and then further reaction is stopped by the addition of water. Thereafter, the kettle charge is poured into more water and the grainy slurry filtered. Crude phenolphthalein is then washed on the filter with hot water until the filtrate is no longer acid to methyl orange test paper.

The method of refining crude phenolphthalein is well known to those skilled in the art. The commercial "yellow phenolphthalein" is produced by dissolving crude phenolphthalein in a dilute alkali, such as sodium or calcium hydroxide, filtering to remove insoluble matter, and then acidifying the clear filtrate with a mineral acid. Yellow phenolphthalein thus produced has a melting point in the range of from 254° C. to about 260° C. U. S. P. phenolphthalein—phenolphthalein that passes the specifications of the United States Pharmacopoeia, vol. XIII—is produced by dissolving the crude in ethanol, refluxing with decolorizing charcoal, filtering, and then crystallizing the phenolphthalein from the alcoholic solution. U. S. P. phenolphthalein has a melting point above 258° C., usually about 261° to 262° C.

The following examples are illustrative of the novel improved process of this invention:

*Example I*

To a lead-lined, jacketed, steel reaction kettle provided with a gate-type agitator, a thermometer, a vent line and a discharge stand-pipe was charged 1,650 lbs. of molten phenol. With continuous stirring 1,300 lbs. of phthalic anhydride, 600 lbs. of anhydrous technical zinc chloride and 420 lbs. of o-p-toluene sulfone chloride mixture where charged to the molten phenol. The o-p-toluene sulfone chloride mixture referred to was the eutectic oil which remained as a filtrate when the solid p-isomer was removed by filtration of the cold reaction mass obtained by chlorosulfonating toluene. The approximate composition of this eutectic oil was 80% o-toluene sulfone chloride and 20% p-toluene sulfone chloride. The above charged reactants represent molar ratios of one mol of phthalic anhydride, two mols of phenol, 0.5 mol of zinc chloride and 0.25 mol of the toluene sulfone chloride mixture.

After all of the chemicals had been charged to the reactor, the kettle was closed and the mass slowly heated by means of steam. Since the initial reaction is exothermic, the condensation temperature of 120° C. was approached cautiously. After a few hours the liberation of heat subsided and the mass temperature was readily controlled by essentially constant steam pressure. The temperature of the reaction mass was held at about 120° C. for 18 hours, after which time analysis showed that the formation of phenolphthalein was essentially complete. 100 gallons of cold water were then added to the reactor while stirring until a homogeneous mass was formed. The contents of the kettle were discharged into 500 gallons of cold water. The resulting mixture was stirred until an aqueous grainy slurry of phenolphthalein was obtained. The phenolphthalein was then filtered and washed with warm (50–60° C.) water until the filtrate was no longer acid to methyl orange test paper.

This quality of crude phenolphthalein was used for the manufacture of yellow phenolphthalein, and because the crude was dissolved in dilute aqueous alkali, the crude was not dried but used directly. If the crude, such as is produced at a lower condensation temperature, is to be used for the production of U. S. P. phenolphthalein, then the crude is dried before dissolving in ethyl alcohol.

On the dry weight basis the quantity of crude phenolphthalein obtained in the above described reaction was about 2,720 lbs., representing a yield of 97% on phenol and phthalic anhydride.

*Example II*

To the same reaction kettle as described in Example I were charged the same quantities of reactants, also as described in Example I. The reaction mass was heated and held at a temperature of about 90° C. for 48 hours. 2,450 lbs. of dried crude phenolphthalein were obtained according to the recovery procedure described in Example I, representing a yield of 87.4% on phthalic anhydride and phenol. This dried crude was used for the manufacture of U. S. P. phenolphthalein.

*Example III*

To a 500 ml. wide-mouth Erlenmeyer flask provided with a gate-type agitator, a thermometer and a vent line were charged 148 g. of phthalic anhydride (1 mol), 188 g. of phenol (2 mols), 68 g. of anhydrous zinc chloride (0.5 mol) and 9.5 g. of p-toluene sulfone chloride (0.05 mol). The reactor was closed with a rubber stopper covered with lead foil. By means of an oil bath, the reaction mass was heated and stirred at about 120° C. for 24 hours. 100 ml. of warm water was then added, and after stirring for a few minutes the mixture was discharged from the flask into the 500 ml. of water. This mixture on stirring for 5 or 10 minutes, resulted in a slurry. The mass was filtered and the solid phenolphthalein washed until the filtrate was no longer acid to methyl orange test paper. The crude phenolphthalein was then dried. The yield was about 80% based on phthalic anhydride and phenol.

*Example IV*

In the same reactor and with the same charges of chemicals, except substituting 28.6 g. of p-toluene sulfone chloride (0.15 mol) instead of the 0.05 mol of p-toluene sulfone chloride, the yield of dried crude phenolphthalein was 93.5% based on phthalic anhydride and phenol when the reaction mass was heated at about 120° C. for 18 hours and then finished according to the procedure as described in Example III.

*Example V*

When 1 mol of phthalic anhydride, 2 mols of phenol, ½ mol of zinc chloride and 0.25 mol of p-toluene sulfone chloride were stirred and heated at about 92° C. for 45 hours and then finished as described in Example III, a 85.4% yield of dried crude phenolphthalein was obtained based on phthalic anhydride and phenol.

*Example VI*

When the charges of reactants as described in Example V were heated at about 120° C. instead of 92° C. for a period of 18 hours, a 95.3% yield of dried crude phenolphthalein was obtained based on phthalic anhydride and phenol.

*Example VII*

An 88.2% yield of dried crude phenolphthalein, based on phthalic anhydride and phenol, was obtained when 1 mol of phthalic anhydride, 2 mols of phenol, 0.5 mol of zinc chloride and 0.25 mol of benzene sulfone chloride were heated and stirred at about 92° for 45 hours, and the crude phenolphthalein recovered according to the procedure as described in Example III.

*Example VIII*

A 93.5% yield of crude phenolphthalein, based on phthalic anhydride and phenol was obtained when 1 mol of phthalic anhydride, 2 mols of phenol, 0.5 mol of zinc chloride and 0.2 mol of p-xylene sulfone chloride were stirred and heated at about 100° C. for 24 hours, and the crude product recovered as described in Example III.

*Example IX*

From a charge of 1 mol of phthalic anhydride, 2 mols of phenol, 0.5 mol of zinc chloride and 0.2 mol of alpha-naphthalene sulfone chloride, a yield of 89.3% of crude phenolphthalein, based on phthalic anhydride and phenol, was obtained when the reaction mass was heated for 24 hours at about 100° C. and the crude phenolphthalein recovered therefrom according to the procedure described in Example III.

*Example X*

Substituting 0.2 mol of beta-naphthalene sulfone chloride for the alpha-naphthalene sulfone chloride in the charge of reactants as described in Example IX, a yield of 91.7% of crude phenolphthalein, based on phthalic anhydride and phenol, was obtained.

What is claimed is:

1. In the process for the preparation of phenolphthalein the step comprising the reaction of phenol with phthalic anhydride in the presence of zinc chloride and a minor amount of an aryl sulfone chloride.

2. In the process for the preparation of phenolphthalein the step comprising the reaction of phenol with phthalic anhydride in the presence of zinc chloride and from about 0.05 mol to about 0.25 mol of an aryl sulfone chloride per mol of phthalic anhydride.

3. In the process for the preparation of phenolphthalein the step comprising the reaction of phenol with phthalic anhydride in the presence of zinc chloride and from about 0.05 to about 0.25 mol of an aryl sulfone chloride per mol of phthalic anhydride at a temperature in the range of from about 85° C. to about 125° C.

4. In the process for the preparation of phenolphthalein the step comprising the reaction of phenol with phthalic anhydride in the presence of zinc chloride and from about 0.05 to about 0.25 mol of a toluene sulfone chloride per mol of phthalic anhydride at a temperature in the range from about 85° C. to about 125° C.

5. In the process for the preparation of phenolphthalein the step comprising the reaction of phenol with phthalic anhydride in the presence of zinc chloride and from about 0.05 to about 0.25 mol of a mixture of o-toluene sulfone chloride and p-toluene sulfone chloride at a temperature in the range of from about 85° C. to about 125° C.

6. In the process for the preparation of phenolphthalein the step comprising the reaction of phenol with phthalic anhydride in the presence of zinc chloride and from about 0.05 to about 0.25 mol of p-toluene sulfone chloride per mol of phthalic anhydride at a temperature in the range of from about 85° C. to about 125° C.

7. In the process for the preparation of phenolphthalein the step comprising the reaction of phenol with phthalic anhydride in the presence of zinc chloride and from about 0.05 to about 0.25 mol of benzene sulfone chloride per mol of phthalic anhydride at a temperature in the range of from about 85° C. to about 125° C.

8. In the process for the preparation of phenolphthalein the step comprising the reaction of phenol with phthalic anhydride in the presence of zinc chloride and from about 0.05 to about 0.25 mol of a xylene sulfone chloride per mol of phthalic anhydride at a temperature in the range of from about 85° C. to about 125° C.

HARRY R. GAMRATH.

No references cited.